July 9, 1963
J. H. DEVINE ETAL
3,096,678
BOLT WITH SELF-CONTAINED MULTI-PART
NUT AND CENTERING SLEEVE
Filed Aug. 24, 1959
7 Sheets-Sheet 1
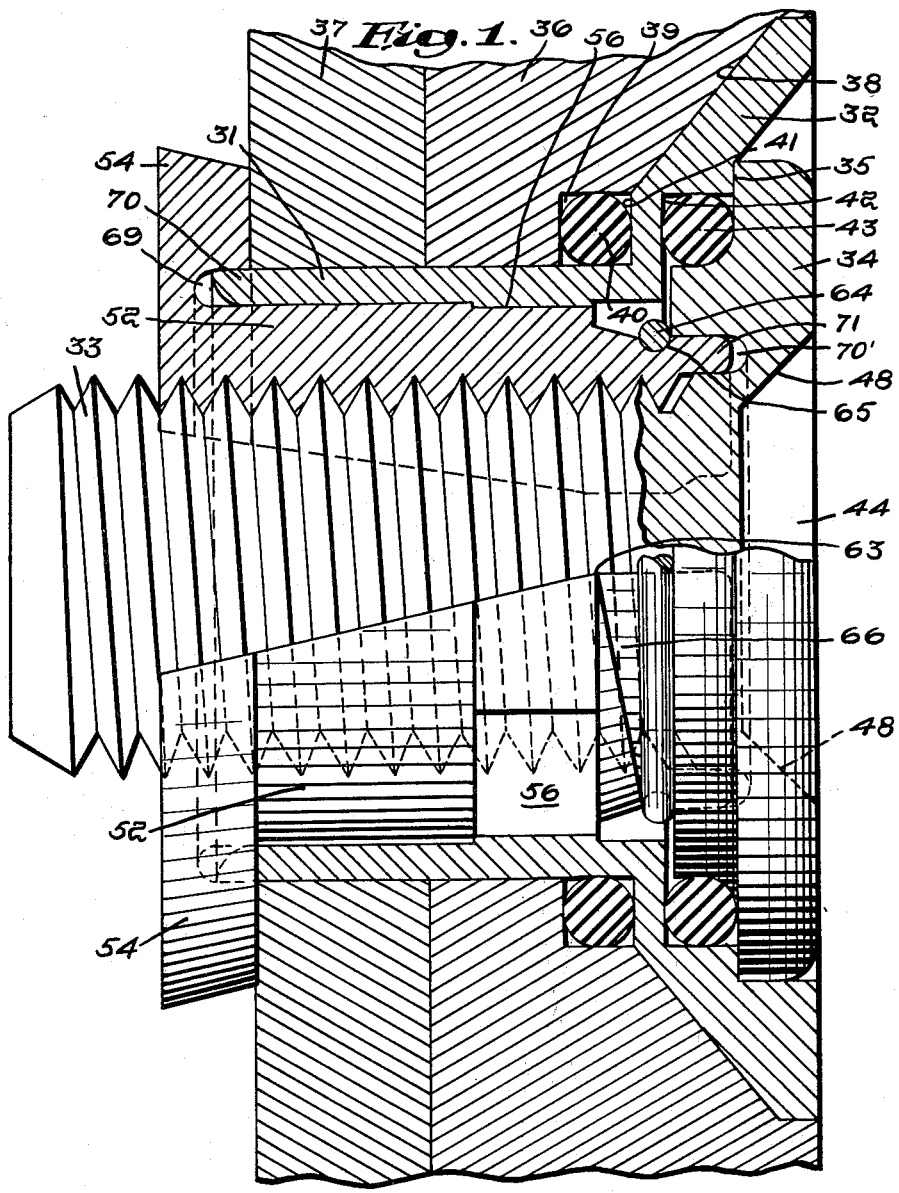
Inventors:
James Henry Devine,
Evelyn Y. Devine,
Arthur D. Thomson Attorney

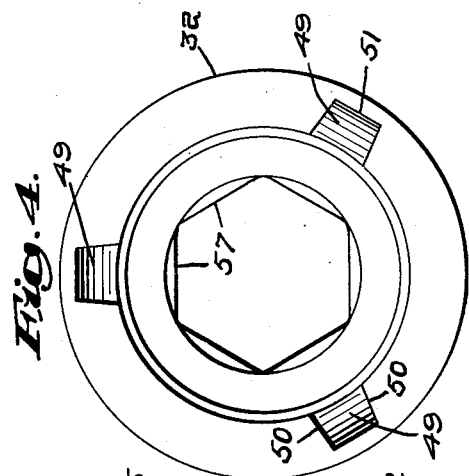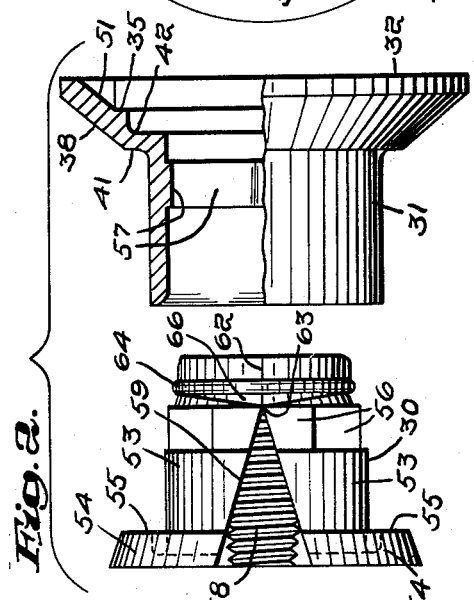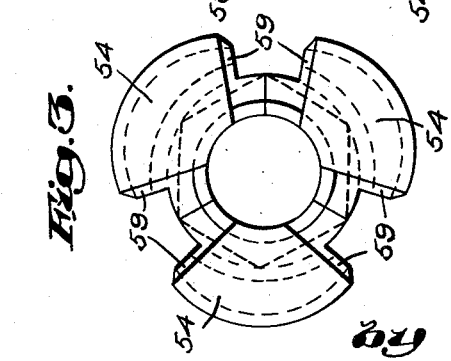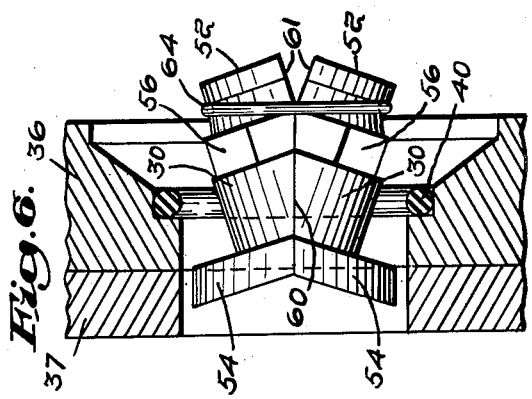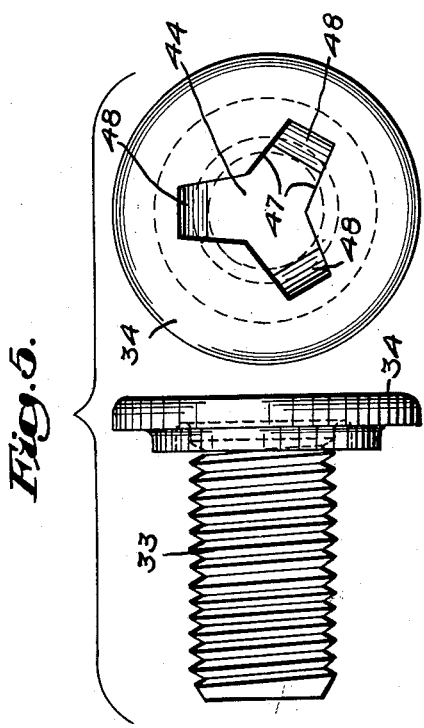

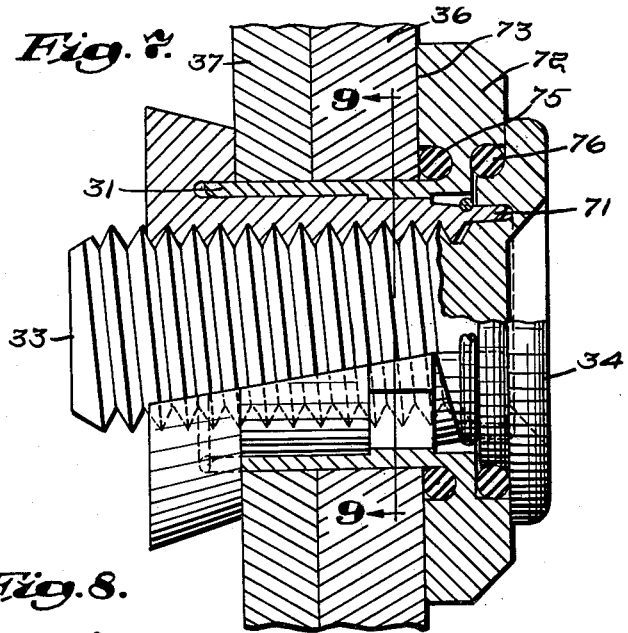
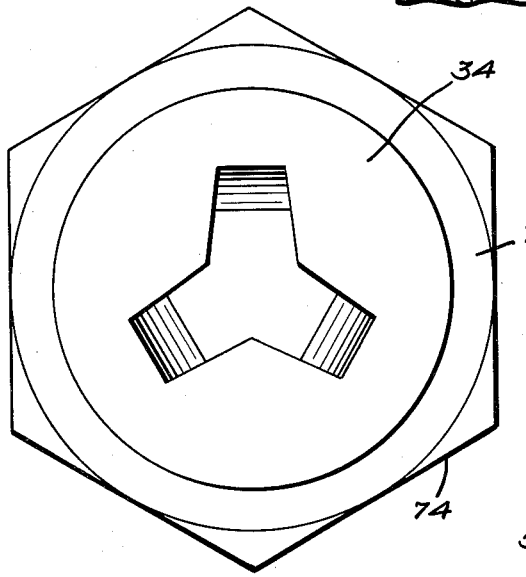
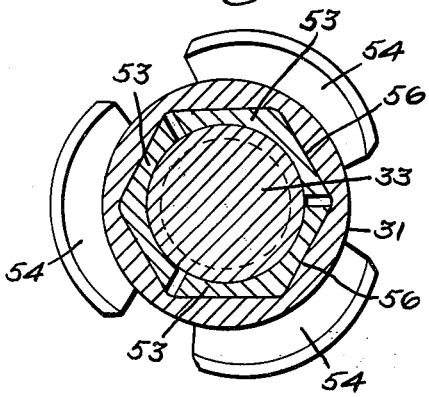

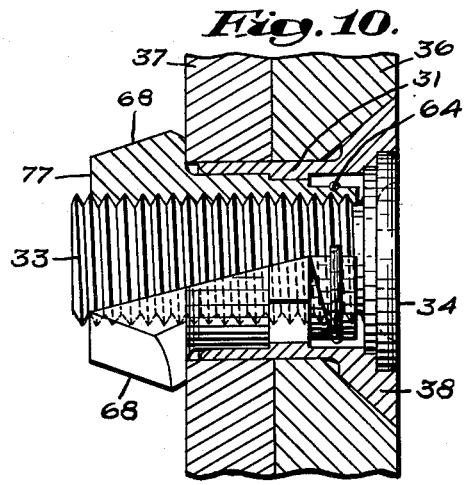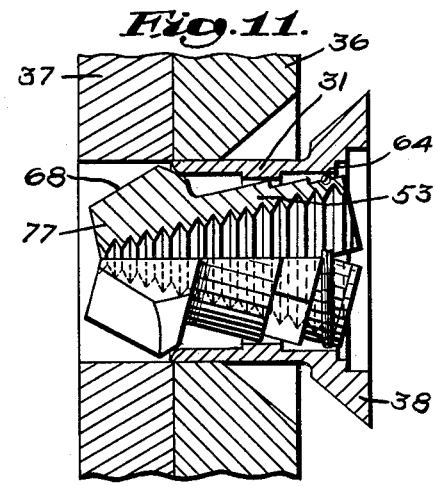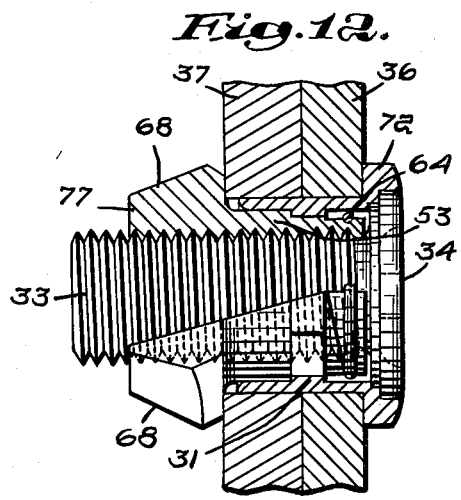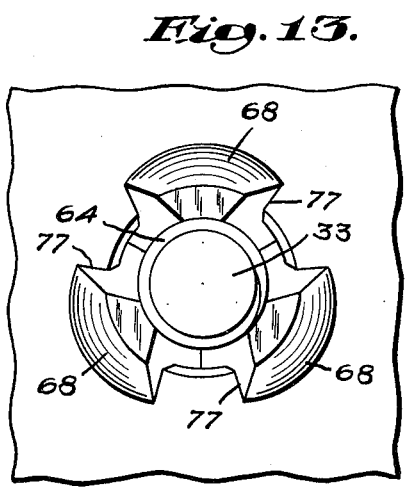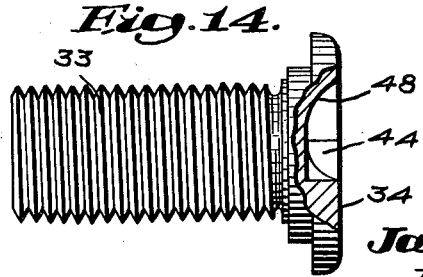

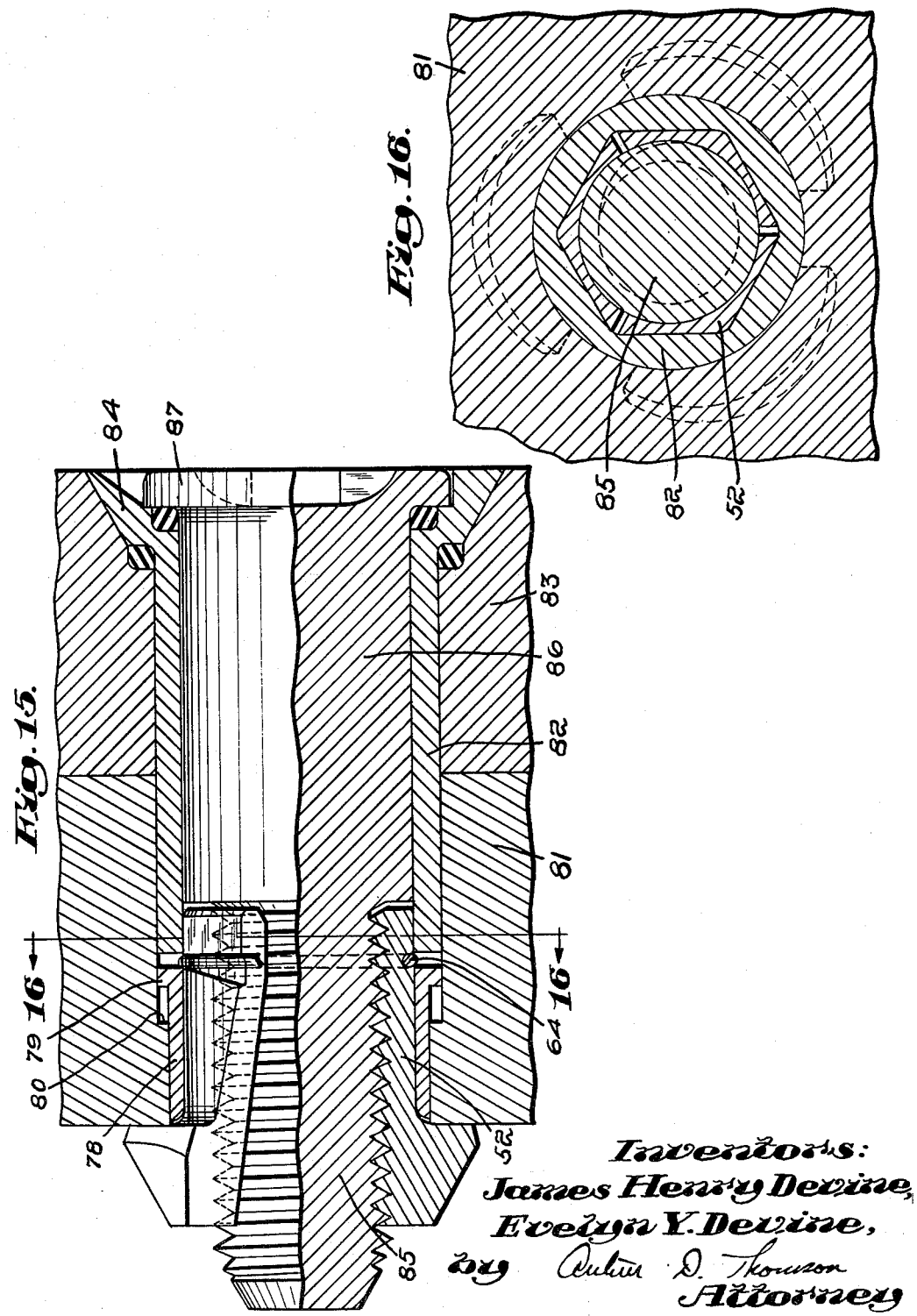

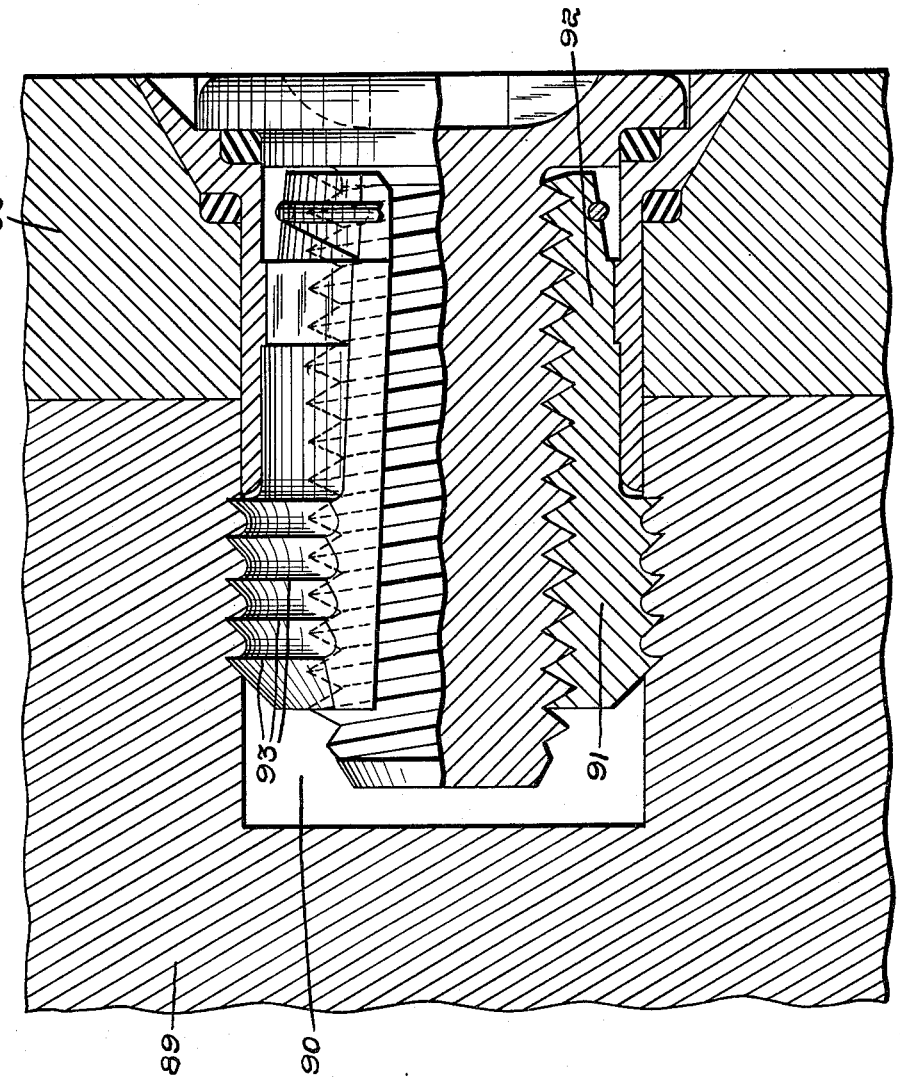

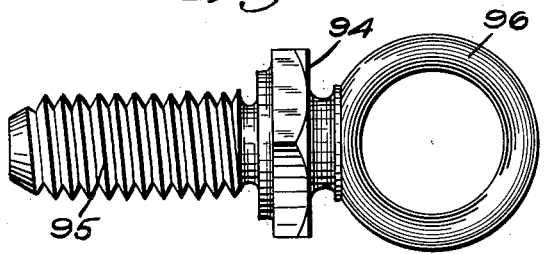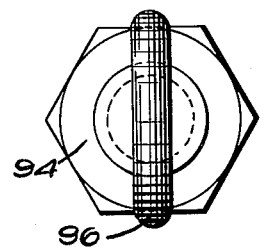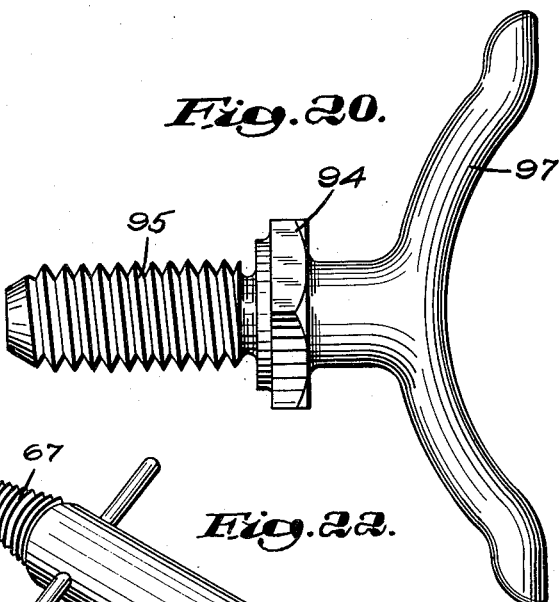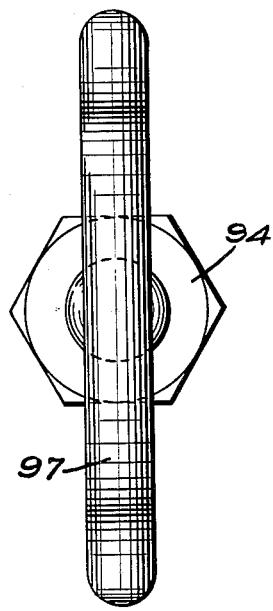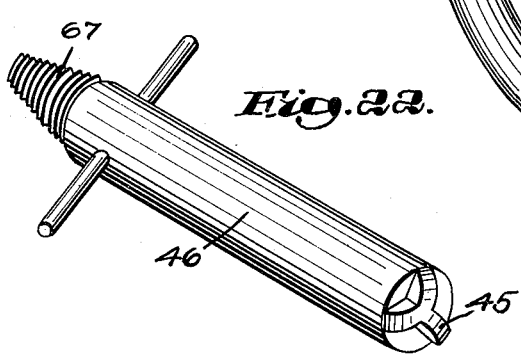

United States Patent Office 3,096,678
Patented July 9, 1963

3,096,678
BOLT WITH SELF-CONTAINED MULTI-PART NUT AND CENTERING SLEEVE
James Henry Devine and Evelyn Y. Devine, Brookline, Mass.; said James Henry Devine assignor to D-Y Trust, Boston, Mass., a trust of Massachusetts
Filed Aug. 24, 1959, Ser. No. 835,580
9 Claims. (Cl. 85—2.4)

This invention relates to bolts for locking together two or more materials having concentric openings therethrough and pertains more particularly to improvements in bolts for securing two layers or panels of structural material irrespective of the accessibility of the outer side of one of the layers. Devices designed for this general purpose have sometimes been referred to as "blind bolts", and examples of some of that type are disclosed in Patents Nos. 2,765,698, 2,804,796, 2,836,095 and 2,875,674 to James H. Devine.

The principal purpose of the present invention is to provide a composite bolt assembly which is insertable and removable at one side of the parts to be secured and which has a multi-part nut assembly, a centering sleeve embracing the movable nut segments and maintaining them in cooperative relationship, and a center component or bolt proper threadable into the nut segments to engage and tighten their head portions against the inaccessible side of the materials being bolted together, or within an inaccessible part thereof.

Bolts produced in accordance with this invention possess unusual strength against shear, tension and bearing stresses, and afford a vise-like clamp for relatively heavy structural materials, comparable in durability to solid bolts or rivets. They are especially serviceable for attaching the skin layers of aircraft to the frame parts of the wings and fuselages, for they are adapted to high speed assembly, they eliminate the fire hazard incident to riveting operations, they will adequately withstand vibration, and they are preferably equipped with resilient O-rings to seal the bolt openings against leakage of liquids or gases. They also eliminate galling, tapped holes, lock washers and lock nuts, for the nut assembly is self-contained and self-locking, and the centering sleeve ensures a true cylindrical bearing surface for the expanded nut segments, regardless of the accuracy or precise alignment of the bored openings in the materials to be joined.

These and other inherent advantages of the improved bolt construction are available for many purposes, for the precision-made assembly may be produced in a variety of sizes of a variety of materials, ferrous or non-ferrous, according to the intended application and the strength desired for the intended purpose. Of particular importance in this respect is a novel function of the centering sleeve which, in cooperation with a retaining ring, not only confines and holds the segments of the nut component in operative relationship, before and during application of the bolt, but also is keyed to the nut segments to prevent relative rotation therebetween. Thus, when, as preferred, the sleeve is equipped with a head portion, either flush or protruding, and the head portion is formed to receive a holding tool, the multi-part nut component may be held against turning when the center component is threaded therein under high torque.

This construction permits a bolt of given diameter to be made in any desired length without changing the standard length, or other dimension of the nut segments. Only the length of the center component and the length of the sleeve, or the use of an auxiliary sleeve, need be employed; the same dies may be used in making the nut component for any feasible bolt length. This feature thus contributes to economy of manufacture, for the nut segments are more difficult and expensive to produce by precision methods, than the sleeve or the center component.

The retaining ring which assists in holding the nut segments in operative relationship and also serves as a temporary stop, engageable with an interior shoulder of the sleeve, to prevent the nut component from dropping through the headed sleeve, is preferably a resilient splint ring or C-ring closely embracing the shank portions of the nut segments and permitting them to move angularly relative to each other on the rocker bearing surfaces of their opposed edges, as hereinafter explained. When, as preferred, the C-ring is applied near the inner ends of the nut component assembly, and the plane of the rocker bearings is disposed inwardly of the C-ring, the outer or head portion of the nut segments are normally expanded against the sleeve. Thus, when the bolt is pressed into the concentric openings of the materials to be clamped together, the head portions of the nut component are yieldingly contracted until the heads of the segments pass through the hole, and then automatically open or expand with a snap action to hold the bolt in the opening. This is a desirable feature for overhead application, particularly.

The foregoing objectives and additional advantages of the improved bolt will become apparent from the following description of the optional embodiments of the invention which are illustrated in the accompanying drawings. It will be understood, however, that the structural details of the bolts herein illustrated and described may be varied to meet the conditions of particular applications, or to satisfy large scale manufacturing requirements, without departing from the essence of the invention, as set forth in the appended claims.

In the drawings,

FIG. 1 is a diametrical section, partly in elevation and partly broken away, of one embodiment of the invention, showing the bolt applied to secure two panels of structural materials, the head of the centering sleeve being of the flush type;

FIG. 2 is a developed elevation, partly broken away, of the nut component assembly and the flush-type sleeve, as shown in FIG. 1;

FIG. 3 is a bottom view of the nut component shown in FIG. 2;

FIG. 4 is a plan view of the flush type sleeve of FIG. 2;

FIG. 5 is a composite view showing the standard center component, or bolt element, in elevation, and the head thereof in plan;

FIG. 6 is a detail section showing the relative position of the nut segments while the nut component is being inserted into the concentric openings of the material, the centering sleeve being omitted for clarity only;

FIG. 7 is a view similar to FIG. 1, but of reduced scale, illustrating a centering sleeve having a head of the protruding type;

FIG. 8 is a plan view of the bolt of the protruding type, as shown in FIG. 7;

FIG. 9 is a section on line 9—9 of FIG. 7, omitting the panels of material secured by the bolt;

FIG. 10 is a sectional view similar to FIG. 1 illustrating a modified and preferred embodiment of the invention, the centering sleeve head being of the flush type;

FIG. 11 is a similar view showing the bolt of FIG. 10 being inserted into the openings of the materials, prior to the application of the center component;

FIG. 12 is a view similar to FIG. 10, illustrating a sleeve head of the protruding type;

FIG. 13 is a bottom view, showing the head portions of the nut component of FIGS. 10 and 12;

FIG. 14 is an elevation, partly broken away, of the standard center component of FIGS. 10 and 12, the same being similar to that component as shown in FIG. 5;

FIG. 15 is a sectional view similar to FIGS. 1 or 10, showing a bolt of greater length equipped with an auxiliary sleeve having a head of the flush type;

FIG. 16 is a section on line 16—16 of FIG. 15;

FIG. 17 is a sectional view, partly in elevation and partly broken away, illustrating a further embodiment of the invention in which the head portions of the nut component are secured within a blind hole of one of the bodies or panels which are bolted together, the bolt being of the flush type;

FIGS. 18 and 19 are elevation and end views, respectively, of a center component having a modified head portion incorporating an optional appliance;

FIGS. 20 and 21 are similar views showing another type of optional appliance; and FIG. 22 is a perspective view of a hand tool useful in applying and removing the nut component assemblies, and for tightening or loosening the standard center component.

It will be understood that the flush type bolts and the protruding type bolts, as referred to in the description of the drawings, are alternative forms of the bolts therein illustrated, the flush type being employed when a substantially smooth or unbroken surface at the bolt or sleeve head is preferred. Except for that optional variation of the sleeve head, the bolt assemblies of equivalent embodiments are substantially the same in construction and operation; it being apparent that the panel opening for the flush type head must be counterbored, whereas counterboring is not required for the protruding type head.

In the flush type form chosen for the purpose of illustration in FIGS. 1 to 6, the improved bolt comprises a self-contained assembly of a triple segment nut component indicated generally at 30 in FIGS. 2 and 6, a centering sleeve 31 embracing the nut component and keyed thereto, and having a flush type head 32 (FIGS. 1, 2 and 4), and a center component, or bolt proper, 33 threading into the nut component and having a head 34 bearing on the sleeve head at an annular shoulder 35.

The bolt fits in concentric openings bored in the parts to be secured together, such as the panels of structural material 36 and 37, the opening in the outer layer 36 being counterbored, as aforesaid, to accommodate the conical under surface 38 of the sleeve head, which may be knurled or serrated, if desired, to restrain rotation of the locked bolt. The exposed surface of the under layer 37 need not be accessible for manipulation of the bolt, for all operations in applying or removing the bolt are performed at the counterbored surface of layer 36.

For liquid and gas sealing, when desired, the opening in layer 36 may be rabbeted at 39 to receive a resilient O-ring 40; and the sleeve head 32 may have a radial shoulder 41 bearing against the sealing ring 40, as shown. It will be understood however, that the rabbeted annular recess 39 may be sufficiently deep to permit the conical undersurface of the sleeve head to continue to the cylindrical body portion of the sleeve 31, eliminating the shoulder 41, and thus simplifying the forming of the sleeve surface. The face of the sleeve head 32 also has an annular groove 42 accommodating another O-ring 43 which is compressed when the head 34 of the center component is tightened against the shoulder 35, to lock the bolt in clamping position.

The surface of the head 34 of the center component is preferably recessed to provide a triple-armed socket 44 for receiving a tool having a complemental projection such as the three-shouldered driver 45 of the hand tool 46 of FIG. 22. The sides 47 of each arm of the recess 44 are preferably inclined with respect to each other at an included angle of about 14°, and the bottoms of the recesses slope upwardly to the surface of head 34 at their outer ends 48 at an angle of about 50°, so that the complemental driver will engage tightly in the socket without slipping under high torque as the center component is being driven to its ultimate locking seat.

The centering sleeve is keyed to the nut component as aforesaid and as will be more fully explained hereinafter, so that relative rotation between these two components is prevented. Hence, by holding the sleeve head stationary while the center component is threaded into the bolt assembly, the nut component will not turn and the bolt can be quickly tightened in place. For that purpose, the flush sleeve head 32 is provided with three notches or recesses 49 (FIG. 4) to receive a three pronged spanner wrench (not shown) for holding the sleeve stationary while the center component is driven home. Here, again, the sides 50 of each recess or notch are inclined with reference to each other, and the bottoms of each recess slope outwardly and upwardly at 51 to receive, and hold the complemental prongs of a spanner wrench. Here, again, for simplicity in production, the recesses 49 may be cut through the rim of the sleeve head, while preserving the included angle of approximately 14° between the notch sides 50.

The recessed features of the heads of the center component, and sleeve, and special power or torque tools for use therewith, will be described and claimed in an application to be filed for copendency herewith.

In accordance with the present invention, the nut component assembly comprises three similarly formed nut segments 52. Each segment is laterally symmetrical and, as best shown in FIGS. 2, 3 and 6, includes a shank portion 53 and a head portion 54 projecting outwardly from the shank portion and having a surface 55 (FIG. 2) adapted to bear flatwise against the exposed surface of the inner panel 37 (FIG. 1) to be locked against the panel 36. The surface 55 may be knurled or serrated, if desired.

Each shank portion is tapered longitudinally and is arcuate in cross-section with curved inner and outer surfaces, except at a region or band intermediate its ends where the outer surface is formed with a pair of flat surfaces 56 intersecting at an angle of 60°, so that the complemental surfaces of the three segments form an approximate hexagon when the segments are contracted as shown, for example, in FIG. 9. These flat surfaces 56 cooperate with the complemental surfaces of an interior hexagonal flange 57 (FIG. 4) in the body 31 of the centering sleeve, thereby keying the parts together and preventing relative rotation between the sleeve and the nut component, as aforesaid. Obviously other keying formations such as serrations or splines, will serve the same purpose as the interfitting hexagons herein illustrated.

The interior curved surface of each shank portion 53 is screw-threaded at 58 (FIG. 2) throughout its length, to receive the complemental threads of the center component 33. Thus, all threads of the contracted segments of the nut component interlock with threads on the center component, under tightening, without galling or seizing, to ensure adequate tension and bearing strength within the balanced bolt.

The opposite longitudinal edges 59 of each nut segment are flat for a substantial portion of their length, and are disposed in planes at an angle of approximately 120° to each other. Hence, when the heads of the segments are contracted, the opposed edges 59 of adjacent segments meet in a radial plane, as indicated at 60 in FIG. 6. At the outer ends of each shank portion, however, each edge surface 61 inclines at an included angle of approximately 16° to edge surface 59. Hence, when the heads of the segments are expanded within the limits of the confining and centering sleeve, the opposed edges 61 of adjacent segments meet in a radial plane, as indicated at 62 in FIG. 2.

Thus, the relatively inclined flat surfaces 59 and 61 on each outer edge of each nut segment provide a rocker bearing at the intersection of those surfaces, as indicated at 63 in FIGS. 1 and 2, so that expansion of the outer ends of the segments causes contraction of the heads 54 thereof (FIG. 6), whereas, contraction of the outer ends of the segments causes expansion of the inner or head ends thereof (FIG. 2).

The segments are retained in this rocker-bearing assembled relationship by a split resilient ring or C-ring 64 which fits in complemental grooves 65 (FIG. 1) of the respective segments. The groove of each segment is relatively narrow in the center of its arcuate outer surface, but widens gradually as it approaches the side edges of the segment, as shown at 66 (FIGS. 1 and 2), so that the C-ring may readily assume the position illustrated in FIG. 6, without binding or snapping out as the respective segments rock together or apart at their outer ends. The depth of groove 65 is about two-thirds of the diameter of the ring 64, so that one-third of its thickness protrudes to provide a stop shoulder which is engageable with portions of the hexagonal flange 57 within the sleeve body 31, to prevent the nut component from passing inwardly through the sleeve and dropping into the hole in the materials to be clamped, when the component is inserted, as shown in FIG. 6. As the heads of the nut segments project outwardly over the inner end of the sleeve, in all movable positions of the assembled segments, said heads limit outward movement of the nut component relative to the sleeve.

The centering sleeve also confines and maintains the nut segments in cooperative relation, and the sleeve is practically unseparable from the nut component after the parts are assembled. Assembly is accomplished by inserting the individual nut segments, outer end foremost, into the body of the sleeve 31, so that they are guided into cooperating position, thereby allowing the head ends 54 to spread outwardly to contract the outer ends, and then forcing the C-ring over said outer ends and into the groove 65, from which it can be removed only with considerable effort, when the groove is relatively deep, as aforesaid. It will be understood that FIGS. 2 and 6 of the drawings are merely illustrative of the nut component assembly, with the C-ring in normal position thereon; for, in assembling the bolt, the C-ring is not applied until the segments are placed in the sleeve, as just described.

The edgewise rocker action of the nut segments not only permits the bolt assembly to be inserted by hand (as in FIG. 6), and then to lock temporarily in the openings, under spring action of the C-ring, but also permits the use of a special tool for inserting and extracting the assembly. Such an instrument may be the conical threaded end 67 of the tool 46 shown in FIG. 22, which threads into the outer end of the nut component to expand that end and contract the head portion thereof, thus facilitating the insetrion and removal of the assembly. A tool of that type, or other instrument capable of expanding the outer ends of the nut segments, is necessary to remove the locked assembly (after the center component is extracted), but the segment heads may be so shaped that they will readily center and contract themselves under manual pressure when the assembly is presented to the mouth of the opening. Such wedge-shaped segment heads are illustrated in FIGS. 10 to 13 showing the outer surfaces 68 inclined inwardly toward the ends of the heads, at an angle of entry of approximately 60°. That form is desirable for quick and easy manual insertion of the assembly, as indicated in FIG. 11.

In FIGS. 1 to 6 and 7, also, the sleeve 31 is sufficiently long to extend beyond the surface of the inner layer of material 37, and the heads of the expanded nut segments are grooved at 69 to receive the protruding end 70 of the sleeve. Similarly, the outer ends of the shanks of the nut segments project at 71 within an annular groove 70' in the bottom face of the head 34 of the center component. These interfitting connections between the parts substantially increase the shear strength of the bolt, and also ensure a right angle bearing between the sleeve and the abutting surface of the inner panel 37. It will also be observed that the body portion of the centering sleeve affords 100% bearing in shear, and prevents the flow of metal from the panels 36 and 37 between the nut segments under shearing stress, which would otherwise prevent removal of the bolt.

It will also be observed that the flatwise engagement of the head portions of the nut component against the exposed surface of the inner layer of material 37 provides a flush abutment in tension which further enhances the strength of the bolt.

The alternative, protruding type bolt of FIGS. 7 to 9 has the same nut component assembly as above described (FIG. 9) and the same center component 33, but the head portion 72 of the centering sleeve 31 consists of an annular flange which overhangs and bears flatwise against the exposed surface of the outer panel of material 36, as shown at 73. The periphery of the head flange 72 is hex-shaped at 74 (FIG. 8) and a standard or socket wrench, rather than a spanner wrench, is employed to hold the sleeve and keyed nut component stationary while the center component is threaded in or out of the nut component.

The O-ring 75, corresponding to ring 40, is received in a suitable recess in the underside of flange 72, but may, as aforesaid, be placed alternatively in a groove rabbeted in the surface of panel 36 without forming a recess in the sleeve head. The O-ring 76, corresponding to ring 43, fits in an annular recess in the top of head flange 72.

In the modified and recommended embodiments illustrated in FIGS. 10 to 14, the assemblies of the flush type and protruding type bolts are generally similar in construction and purpose, except that the head portions of the nut segments 77 are thicker lengthwise and the outer surfaces 68 thereof are inclined downwardly and inwardly, as aforesaid, at an angle of approximately 60° to the axis of the bolt. The O-rings of the previous forms are also omitted in FIGS. 10 to 12, but may obviously be supplied, if desired.

The nut assembly of this embodiment may be press snapped into the panel openings by hand, without using the tool of FIG. 22 or other implement to spread the outer ends of the nut segments and contract the heads thereof to the position of FIG. 11. The sloping or beveled nut heads 77 ensure their automatic closing when the segments are centered in the panel opening and pressed inwardly. As soon as the projecting shoulders of the nut heads pass through the panel openings, the heads spring outwardly under action of the rocker surfaces and the C-ring 64, thereby automatically retaining the assembly within the concentric openings. It is then easy to thread the center component 33 into the nut component to lock the bolt and clamp the panels together.

It will be observed that in the protruding type of bolt shown in FIG. 12, the head 34 of the center component 33 is recessed into the head 72 of the centering sleeve, so that the exposed surfaces of both heads are flush with each other, as in FIG. 10.

The modification of FIGS. 15 and 16, is designed to permit utilization of a nut component assembly as previously described in panel openings of substantially greater depth, without lengthening the nut segments which correspond to the segments of FIGS. 10 to 13. In this modification, the centering sleeve 78 does not have either of the head portions of the previous embodiments. The outer end of sleeve 78 terminates short of the C-ring 64 and has a relatively narrow outwardly projecting flange 79 engageable with an annular shoulder 80 of the bored opening in panel 81, to prevent the assembly from dropping through that opening.

In this form, the outer surface of the nut segments need not be keyed to the centering sleeve 78, but are keyed to an auxiliary sleeve 82 which extends into the openings in panels 83 and 81 and fits closely over the outer ends of the nut segments 52. The complemental surfaces of the interfitted portions may be generally hex-shaped as previously described, or otherwise keyed or splined together to prevent relative rotation between the parts while permitting relative longitudinal movement.

The auxiliary sleeve 82 extends from the aforesaid keyed connection with the nut component to the surface of the outer panel 83 where the sleeve may have the flush type head 84 (FIG. 15) or the protruding type head as previously described.

In this embodiment, the center component is long enough to extend through the concentric openings in the panels and has a threaded end portion 85 engaging the threads of the nut component, as aforesaid. Its shank portion 86 need not be threaded, however. It is preferably cylindrical and of larger diameter than the threaded portion 85, as shown in FIG. 15. The outer end of the center component has a bearing head 87 similar to the heads of the previously described center components.

It will be apparent that the auxiliary sleeve 84 is necessary only for the purpose of preventing rotation of the nut assembly 78, in the arrangement shown in FIG. 15, and that other means may be provided for performing that function so that the auxiliary sleeve may be eliminated. For example, by enlarging the shoulder or flange 79 of the centering sleeve with respect to the diameter of the opening in the panel, and transversely serrating the periphery of the flange or making it of diagonal shape, the centering sleeve would broach out portions of the wall of the opening when driven therein and thus firmly lock the sleeve against rotation in the opening. The centering sleeve would be keyed to the nut segments in the manner previously explained, to restrain rotation of the nut component; and the diameter of the center cylindrical portion of the center component would be adjusted to coincide with the diameter of the opening in which it fits.

In the modification of FIG. 17, the belt is used to secure an outer panel 88 to a body of material 89 having a blind hole 90 rather than a through opening. For this purpose, the head portions 91 of the nut segments 92 are provided with sharpened annular teeth or serrations 93 to bite into the wall of the blind hole 90, when the standard form of center component is tightened into the nut component, thereby to lock the bolt and secure panel 88 to body 89.

FIGS. 18 to 21 illustrate optional forms of center components in which the heads thereof have projecting appliance elements which serve as manipulating handles as well as fixtures for other purposes. These projecting elements take the place of the torque recesses described in connection with the previous views of the center component. Otherwise, the threaded and headed component functions as before.

In FIGS. 18 and 19, the head 94 of threaded component 95 is equipped with a projecting ring 96 so that the member serves as an eye-bolt. In FIGS. 20 and 21, the head is provided with a cleat or bit 97. These forms of center component are particularly useful when the bolt assemblies are employed in decks, bulkheads or other partitions of naval vessels, for example. As indicated above, the ring, cleat or other appliance formed integral with or attached to the head of the center component, or bolt proper, provides a convenient handle for tightening the same in the nut component of the bolt, as well as providing the advantages of a handy appliance or fitting.

The construction and purpose of the hand tool shown in FIG. 22 has been described, and it has been explained that other torque ratchet or power tools for the same purpose, are to be described in a separate application of these applicants.

The multi-part bolts comprising the self-contained sleeve and nut assemblies as herein disclosed afford an adequate and efficient solution of the troublesome problem of securing together two or more panels, such as metal plates or other structural materials, without the hazards of welding or riveting, particularly when the exposed surface of one of the panels is inaccessible for manipulation of the head or nut of a standard, solid bolt. The improved bolt fully satisfies the purposes heretofore explained and provides a handy connector which is easy to apply, speedy in application and strong and durable in use.

These desirable results are attributable, in part, to the fact that the rocker bearing for the plural nut segments of the improved bolt is located between the outer surfaces of the bolted panels, as contrasted with the location of the pivot plane at the outer surface of the outer panel, as in the Devine patents mentioned in the early part of this specification; and to the provision of the centering sleeve which contains the nut segments and their retaining ring.

We claim:

1. A blind bolt for clamping together two or more structural panels having concentric openings therethrough, irrespective of the accessibility of the opening in the innermost panel, the bolt being insertable in said openings and removable therefrom, and comprising:
    a rigid centering sleeve extending through said openings and having a flanged head portion engageable with a surface of the outermost panel, and a continuous, cylindrical interior wall portion providing a bearing surface;
    an expandable nut component assembly comprising at least three separate and separable complemental segments rockable angularly with respect to each other in planes radial to the axis of said sleeve, from mutually contracted, unlocking position to mutually expanded, locking position; and resilient means encircling said segments, intermediate the ends thereof, for holding the segments in cooperative, mutually abutting relation and for yieldingly restraining rocking movement thereof;
    each nut segment having a rigid shank portion of substantially arcuate cross-section provided with a curved, screw-threaded inner surface, and an outwardly projecting clamping head portion engageable flatwise with a surface of the innermost panel when the nut component assembly is expanded to locking position;
    the nut component assembly being movable longitudinally of said sleeve, and the expanded segments having sliding engagement with said interior bearing surface of the sleeve;
    a solid, cylindrical, screw-threaded center component threading into the nut segments to expand the nut segments and to draw the nut component assembly into the sleeve to move the head portions of the segments to locking position against the innermost panel; the center component providing a solid core for the bolt and having a head portion engageable with the head portion of the sleeve during torquing rotation of the center component; and
    means for restraining relative rotation between the nut component and the sleeve while the bolt is being tightened to locking position.

2. A blind bolt as described in claim 1, the maximum circumference of the fully contracted heads of the nut segments being less than the circumference of the panel openings and greater than the circumference of the interior wall of said sleeve, whereby the sleeve and nut component may be removed as a unit from said panel openings, but outward movement of said heads into the sleeve is prevented; and cooperative means in the sleeve and nut component limiting inward movement of the nut component relative to the sleeve, so that the assembled sleeve and nut component constitute a self-contained unit.

3. A blind bolt as described in claim 2, the shank portions of the nut segments having complemental edges providing rocker bearings between adjacent segments, and said bearings being disposed in a radial plane spaced from the opposite ends of the nut component assembly, and said resilient means embracing the nut segments in a region outwardly of said rocker plane, so that the nut segments of the unstressed bolt are normally biased toward expanded position.

4. A blind bolt as described in claim 3, the clamping heads of the nut segments having flat surface portions engaging the bottom surface of the innermost panel flatwise in a plane at right angles to the longitudinal axis of the bolt.

5. A blind bolt as described in claim 3, the head portion of the center component having an annular recess in its underside receiving the outer ends of the nut segments when the bolt is in locking position.

6. A blind bolt as described in claim 3, the head portions of the nut segments having arcuate recesses receiving the inner end of the sleeve when the bolt is in locking position.

7. A blind bolt as described in claim 3, said resilient means consisting of a spring ring, and said spring ring providing an external peripheral shoulder in the nut component; and said sleeve having an internal shoulder engageable by said spring ring to limit inward movement of the nut component relative to the sleeve.

8. A blind bolt as described in claim 7, said internal shoulder of the sleeve being keyed to the nut component to restrain rotation thereof relative to the sleeve.

9. A blind bolt as described in claim 8, the head portion of said center component having a torque recess for receiving a torquing tool, and the head portion of said sleeve having formations engageable by a tool for holding the sleeve stationary while the center component is being screwed into the nut component assembly.

References Cited in the file of this patent
UNITED STATES PATENTS

| | | |
|---|---|---|
| 223,327 | Farrington | Jan. 6, 1880 |
| 594,526 | Glauber | Nov. 30, 1897 |
| 1,130,003 | Masor | Mar. 2, 1915 |
| 1,755,590 | Carr | Apr. 22, 1930 |
| 2,259,137 | Iftiger | Oct. 14, 1941 |
| 2,388,179 | Prowd | Oct. 30, 1945 |
| 2,404,169 | Gidden | July 16, 1946 |
| 2,804,796 | Devine | Sept. 3, 1957 |

FOREIGN PATENTS

| | | |
|---|---|---|
| 13,936 of 1908 | Great Britain | Dec. 28, 1908 |